US008855917B2

(12) United States Patent
Koenig et al.

(10) Patent No.: US 8,855,917 B2
(45) Date of Patent: Oct. 7, 2014

(54) SYSTEM AND METHOD FOR USE OF A VEHICLE BACK-UP CAMERA AS A DEAD-RECKONING SENSOR

(75) Inventors: Michael Koenig, Irvine, CA (US); Keith Brodie, Irvine, CA (US)

(73) Assignee: CSR Technology Inc., San Jose, CA (US)

(*) Notice: Subject to any disclaimer, the term of this patent is extended or adjusted under 35 U.S.C. 154(b) by 1409 days.

(21) Appl. No.: 12/252,701

(22) Filed: Oct. 16, 2008

(65) Prior Publication Data

US 2010/0100321 A1 Apr. 22, 2010

(51) Int. Cl.
*G01C 21/00* (2006.01)
*G06K 9/00* (2006.01)
*G01C 21/34* (2006.01)
*G01C 21/20* (2006.01)
*G01C 21/36* (2006.01)
*G01S 19/45* (2010.01)
*G01C 21/10* (2006.01)
*G01C 21/26* (2006.01)
*G01C 21/04* (2006.01)

(52) U.S. Cl.
CPC ........ *G06K 9/00791* (2013.01); *G01C 21/3461* (2013.01); *G01C 21/20* (2013.01); *G01C 21/3658* (2013.01); *G01C 21/005* (2013.01); *G01S 19/45* (2013.01); *G01C 21/10* (2013.01); *G01C 21/00* (2013.01); *G01C 21/26* (2013.01); *G01C 21/04* (2013.01)
USPC ........... 701/409; 701/400; 701/408; 701/410; 701/425; 701/450; 701/469; 701/500; 701/532

(58) Field of Classification Search
CPC ........ G01C 21/00; G01C 21/04; G01C 21/05; G01C 21/10; G01C 21/20; G01C 21/26; G01C 21/3461; G01C 21/3658
USPC ......... 701/200, 207, 208, 209, 214, 409, 400, 701/408, 417, 532, 410, 425, 450, 469, 472, 701/500
See application file for complete search history.

(56) References Cited

U.S. PATENT DOCUMENTS

| 4,906,940 | A | * | 3/1990 | Greene et al. ............... 382/100 |
| 5,517,419 | A | * | 5/1996 | Lanckton et al. ............ 701/409 |
| 6,687,571 | B1 | * | 2/2004 | Byrne et al. ................. 700/245 |

(Continued)

OTHER PUBLICATIONS

Clark F. Olson a,*, Larry H. Matthies b, Marcel Schoppers b, Mark W. Maimoneb; "Rover navigation using stereo ego-motion" article presented at a Computing and Software Systems, University of Washington, 18115 Campus Way NE, Box 358534, Bothell, WA 98011-8246, USA b Jet Propulsion Laboratory, California Institute of Technology, 4800 Oak Grove Drive.*

*Primary Examiner* — Yogesh C Garg
(74) *Attorney, Agent, or Firm* — Haynes and Boone, LLP

(57) ABSTRACT

Systems and methods are disclosed herein to use a vehicle back-up camera as a cost-effective dead-reckoning sensor in satellite-based vehicle navigation systems. Since the back-up camera may already use a display of the navigation system for display, the data from the back-up camera may be easily obtained and integrated into the navigation system. The data from the camera is received by a navigation receiver wirelessly or through a wired connection. The image is processed to determine the speed, heading, turn-rate of the vehicle to aid the satellite-based navigation system if the satellite signals are inadequate. Thus, enhanced vehicle navigation- performance can be obtained without adding new sensors and/or connecting to a vehicle data bus.

16 Claims, 7 Drawing Sheets

(56) References Cited

U.S. PATENT DOCUMENTS

| | | | |
|---|---|---|---|
| 2003/0072374 A1* | 4/2003 | Sohm | 375/240.16 |
| 2005/0163343 A1* | 7/2005 | Kakinami et al. | 382/103 |
| 2006/0005447 A1* | 1/2006 | Lenner et al. | 42/111 |
| 2006/0147087 A1* | 7/2006 | Goncalves et al. | 382/103 |
| 2007/0019181 A1* | 1/2007 | Sinclair et al. | 356/4.01 |
| 2008/0249710 A1* | 10/2008 | Takada | 701/209 |

* cited by examiner $\alpha$ = View Angle, Horizontal
$\beta$ = View Angle, Vertical
$\delta$ = Declination Angle
$\phi$ = Pan Angle (CCW)
$\rho$ = Rotation or Twist Angle (CCW)
$dx$ = Lateral Offset
$dy$ = Longitudinal Offset
$dz$ = Vertical Offset

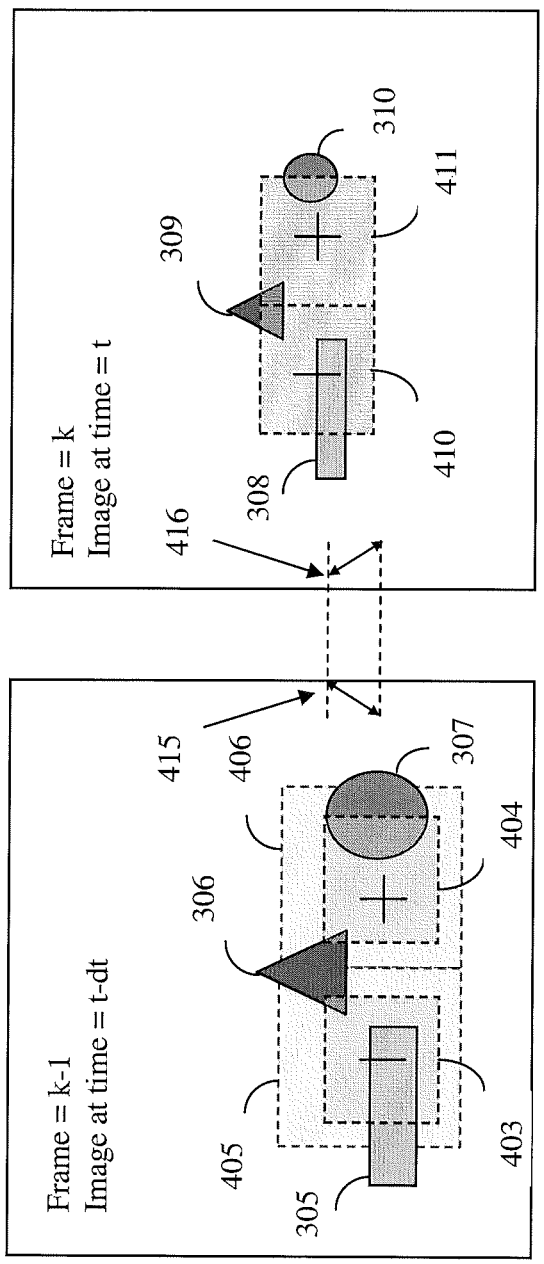

SYSTEM AND METHOD FOR USE OF A VEHICLE BACK-UP CAMERA AS A DEAD-RECKONING SENSOR

TECHNICAL FIELD

The present disclosure relates generally to a system and method for using dead-reckoning sensors to aid in vehicle navigation. Specifically, the present disclosure relates to a system and method for use of a camera as a dead-reckoning sensor to aid a vehicle navigation system employing a satellite-based navigation system.

BACKGROUND

Satellite-based navigation systems such as the Global Positioning System (GPS) may suffer degradation and outages due to multipath reflectors and blockages between the satellite transmitters and the vehicle's GPS antenna. This results in degraded performance, particularly in urban canyons and tunnels. To provide navigation updates in the absence of GPS signal reception, a variety of dead reckoning enhancements have been offered as adjuncts to GPS navigation systems. Navigation using dead reckoning involves calculating a current position based upon the heading and distance from a previously known position. Dead-reckoning sensors provide information such as vehicle velocity, acceleration, heading, etc. to aid a GPS receiver in its navigation solution. Typical sensors include the vehicle odometer, individual wheel speed sensors, rate gyros, accelerometers, magnetic compass, and barometric pressure sensors. Many of these sensors incur the costs of either a) purchasing the additional sensors and integrating them with the navigation system, or b) getting access to existing sensor data on a vehicle data bus, which can raise vehicle safety and warranty issues. As such, the cost of acquiring specialized sensors and/or the complication of integrating such sensors into a satellite-based navigation system have prevented widespread adoption of dead-reckoning sensors into vehicle navigation system using GPS.

Accordingly, there is a need in the art for improved satellite-based navigation systems that can practice dead reckoning as an adjunct navigation technique without requiring additional or difficult-to-integrate dead-reckoning sensors.

BRIEF SUMMARY

Systems and methods are disclosed herein to use a vehicle back-up camera as a cost-effective dead-reckoning sensor in a vehicle employing a satellite-based navigation system such as GPS. Since conventional back-up cameras typically display their images using a navigation system's display, the image data from the back-up camera may be easily obtained and integrated into the navigation system. This image data from the camera may be received by the GPS receiver wirelessly or through a wired connection. The image is processed to determine factors such as the speed, heading, or turn-rate of the vehicle to aid the navigation system when the satellite signals are severely degraded. Thus, enhanced vehicle navigation performance can be obtained without adding new sensors and/or connecting to a vehicle data bus.

In accordance with one or more embodiments of the present disclosure, a vehicle dead-reckoning system includes a back-up camera mounted on the rear of a vehicle to provide video data, a video dead-reckoning subsystem to process the video data for estimating vehicle motion such as velocity and turn rate, and a GPS navigation system that uses the estimated vehicle motion as an aid in generating a navigation solution for the vehicle. The video dead-reckoning subsystem processing includes a frame capture circuit to sample and store the video data periodically or in a burst mode, one or multiple correlators to independently search for a displacement vector between image elements from two frames, and a video dead-reckoning estimator to estimate vehicle motion based on the displacement vector(s).

In accordance with one or more embodiments of the present disclosure, the correlator takes the image elements bounded within a region of a first frame of video data and determines the shifted position of a region bounding the image elements from a second frame that gives the best correlation between the image elements in the two regions. This shifting of the region between two frames of video data may be represented by a displacement vector. When there are multiple correlators, each correlator may operate on its own region to generate an independent displacement vector. Multiple correlators help to reduce error in the correlation attributable to perspective effect as image elements are displaced due to vehicle motion, and also allow for more observability of the states to be estimated.

In accordance with one or more embodiments of the present disclosure, the video dead-reckoning subsystem estimates vehicle motion and spatial parameters of the back-up camera from the displacement vectors determined by the correlators. The video dead-reckoning subsystem performs an image-to-ground transformation of an initial image position within a first correlation region based on an estimate of the spatial parameters of the camera to provide an initial ground position, estimates a final position on the ground plane relative to the initial ground position based on an initial estimate of the vehicle motion, performs a ground-to-image transformation of the estimated final position to provide an estimated image position within a second correlation region, determines a final image position in the second correlator region based upon the initial image position within the first correlation region and a corresponding displacement vector, compares the final image position to the estimated image position to determine an error, and revises the initial estimate of vehicle motion and the estimate of the spatial parameters of the camera based upon the error. These transformations and estimations are performed as a function of the spatial parameters of the back-up camera such as its position on the vehicle, its orientation, and its field of view.

These and other objects and advantages of embodiments of the present disclosure will be more fully understood by reference to the following detailed description when considered in conjunction with the following drawings.

BRIEF DESCRIPTION OF THE DRAWINGS

FIG. 4A shows a first frame of image data from a back-up camera wherein two correlators correlate image data;

FIG. 4B shows a second frame of image data from the back-up camera of FIG. 4A;

Embodiments of the present disclosure and their advantages are best understood by referring to the detailed description that follows. It should be appreciated that like reference numerals are used to identify like elements illustrated in one or more of the figures.

DETAILED DESCRIPTION

Systems and methods for using a vehicle back-up camera as a dead-reckoning sensor to aid a satellite-based vehicle navigation system are disclosed. The following examples concern GPS-based navigation systems but it will be appreciated that the systems and methods disclosed herein are widely applicable to other types of satellite-based navigation systems. These systems and methods enable dead-reckoning capability without requiring the addition of any new sensors or the connection to a vehicle data bus.

Figure 1A:
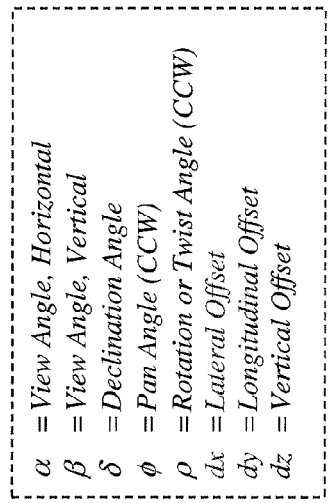
FIG. 1A is an overhead view of a back-up camera mounted on the rear of a vehicle according to one or more embodiments of the present disclosure.
Figure 1B:
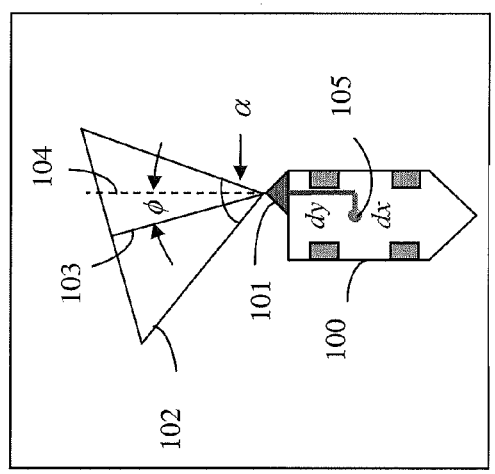
FIG. 1B is a side-view of the location and orientation of the back-up camera of FIG. 1A.
Figure 1C:
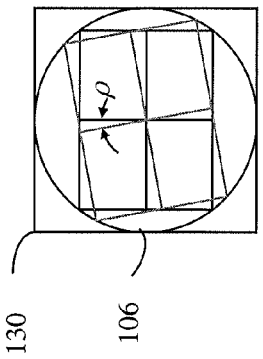
FIG. 1C shows a back-up camera field of view framed by a horizontal field of view and a vertical field of view according to one or more embodiments of the present disclosure.
Figure 1D:
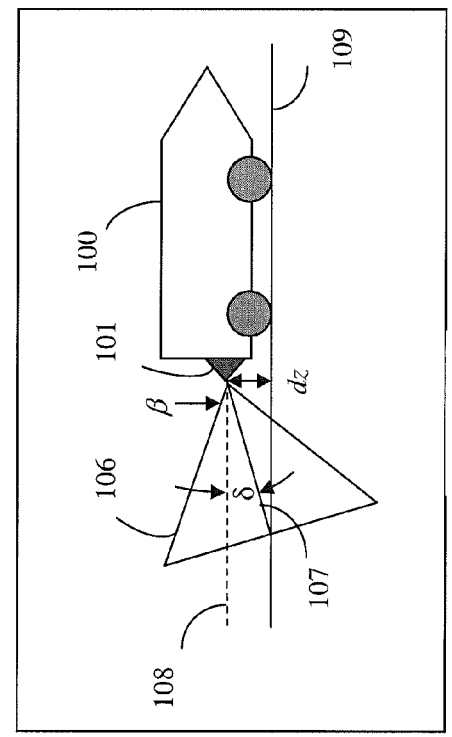
FIG. 1D is a table of the spatial parameters associated with the location and orientation of a back-up camera on a vehicle according to one or more embodiments of the present disclosure.

Turning now to the drawings, FIGS. 1A and 1B show the location and orientation of a back-up camera on a vehicle according to one or more embodiments of the present disclosure. FIG. 1C shows a field of view from the back-up camera according to one or more embodiments of the present disclosure. FIG. 1D is a table of spatial parameters associated with the location and orientation of the back-up camera on the vehicle according to one or more embodiments of the present disclosure. Referring again to FIG. 1A, there is shown an overhead view of the location and orientation of a back-up camera 101 mounted on the rear of a vehicle 100. The back-up camera 101 has a horizontal field of view 102 with a horizontal view angle α. The horizontal view angle α is determined by the lens and aperture of the back-up camera 101. The back-up camera 101 may be oriented to create a pan angle φ which is the angle between a horizontal center line 103 bisecting the horizontal view angle α and a line 104 parallel to the y-axis of the vehicle 100 and originating from the camera 101. The y-axis of the vehicle is oriented longitudinally whereas the x-axis is transverse to the y-axis. The lateral offsets dx and dy are the x-axis and y-axis offset, respectively, of the camera 101 from a body center 105 of the vehicle 100, or from the location of a navigation system in the vehicle frame. The lateral offsets dx and dy act like a moment arm. The velocity and rotation determined by image data from camera 101 may be extrapolated to the body center 105 of the vehicle 100 or to the location of the navigation system.

FIG. 1B shows a side-view of the location and orientation of the back-up camera 101 mounted on the rear of vehicle 100. The back-up camera 101 has a vertical field of view 106 with a vertical view angle β. The vertical view angle β is determined by the lens and aperture of the back-up camera 101. The back-up camera 101 may be oriented downward to create a declination angle δ which is the angle between a vertical center line 107 bisecting the vertical view angle β and a horizon line 108 running parallel to a ground plane 109 and originating from camera 101. The back-up camera 101 has a vertical offset dz from the ground plane 109. The declination angle δ and the vertical offset dz may change due to vehicle loading or when the vehicle travels over uneven surfaces such as speed bumps, or essentially anything which affects the vehicle's relationship to the ground.

FIG. 1C shows a back-up camera field of view framed by horizontal field of view 102 and vertical field of view 106. The back-up camera may be rotated by a rotation or twist angle ρ from the vertical to create a twisted image. The image captured by the back-up camera has a pixel resolution in the horizontal and vertical direction. FIG. 1D summarizes the spatial parameters associated with the location of the back-up camera 101 on the vehicle such as dx, dy, and dz, the spatial parameters associated with the orientation of the back-up camera 101 (δ, φ, and ρ) and the spatial parameters associated with the viewing angles (α, β).

Figure 2:
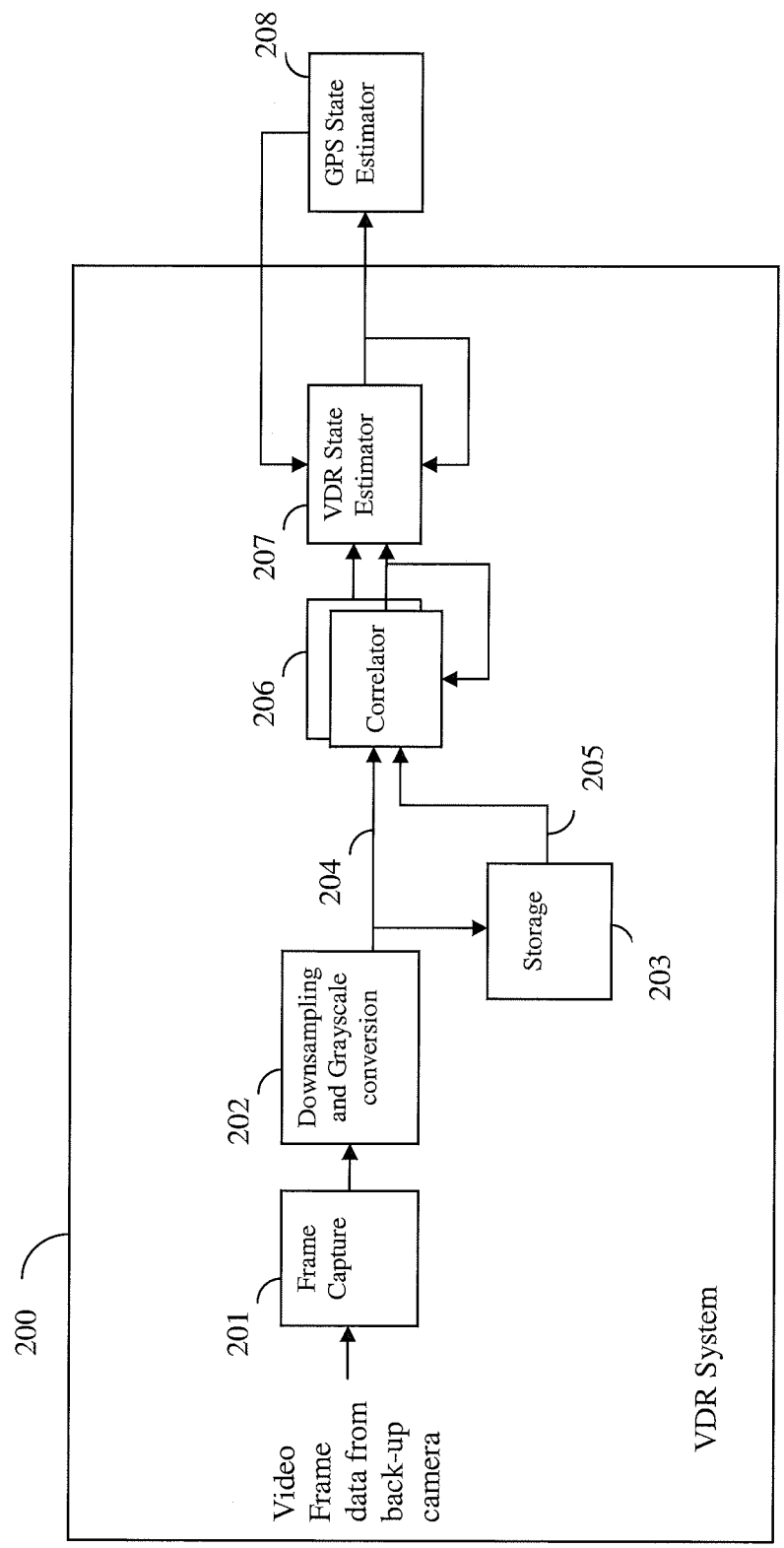
FIG. 2 is a block diagram of a video dead-reckoning (VDR) system for processing video data received from a back-up camera to generate vehicle motion data to a GPS navigation system according to one or more embodiments of the present disclosure.

FIG. 2 is a block diagram of a VDR (video dead-reckoning) system 200 for processing video data received from a back-up camera to generate vehicle motion data for a GPS navigation system according to one or more embodiments of the present disclosure. The VDR system 200 includes a frame capture module 201 to sample the video frame data, a downsampling and grayscale conversion module 202 to downsample and convert the sampled frame data to grayscale scale, a storage or memory 203 to store the processed frame data, one or more correlators 206 to search for image correlation between a current frame data and a stored frame data, and a VDR state estimator 207 to estimate vehicle motion and camera parameters. All of the processing in the VDR system 200 may be performed in software by the same processor used by the GPS engine/system, by an additional co-processor, or through other hardware support. The estimated vehicle motion data from the VDR system 200 are fed to a GPS state estimator 208 to aid in the generation of the navigation solution for the vehicle.

The VDR system 200 samples the video frame data from the back-up camera and compares or correlates image data between two frames sampled at different times to estimate the motion of image elements on the ground so as to estimate the motion of the vehicle. Video frame data may be received wirelessly from the back-up camera or through a wired connection. It is conventional for back-up cameras to display their images using the display for the navigation system. Thus, video frame data from the back-up camera may be readily available for integration into the VDR system 200. Video frame data may be received in a standard video interface with a pixel resolution and a frame rate specific to the back-up camera used. For example, video data may be received in a 3-channel, 8-bit, RGB interface with 640×480 pixel resolution at 30 frames per second. VDR system 200 need merely couple to this pre-existing interface to capture the video frame data. Because such an interface is already provided in conventional GPS navigation systems, integration of VDR system 200 is readily performed by the GPS navigation system manufacturer without requiring any modification by the vehicle manufacturer.

Video frame data are initially captured by the frame capture module 201. Frames may be captured at the frame rate, at a periodic rate less than the frame rate, or in a burst mode. The capture rate may also be adjusted as a function of vehicle dynamics. The capture rate selected is a trade off between the maximum vehicle dynamics to be tracked and the computational bandwidth available for VDR processing. If a higher velocity is to be reliably tracked, the captured frame image may have to be processed before correlation to compensate for any perspective effect on the image introduced when there is significant image displacement due to the higher vehicle velocity. This may impose an additional throughput requirement on the VDR system. Alternatively, video frame data may be captured at less than the frame rate to ameliorate the computational burden at a cost of a slower update rate from the VDR system 200 for estimating the vehicle motion. For example, two consecutive frames may be captured followed by a long idle interval before another two consecutive frames are captured again. The duty cycle of the sample capture may be adjusted based on the desired update rate from the VDR state estimator 207. Burst mode is an extension of this mode. In a burst mode, video frame data are captured in a burst for a short duration with a low duty cycle to reduce the processing load. For example, if an update rate of one hertz from the VDR is sufficient, video frame data may be captured in burst mode for only 5 consecutive frames per 1 second period, for a duty cycle of 5/30, given a frame rate of 30 frames per second. The captured frames may then be processed during the remainder of the one second period in order to reduce the processing load.

The captured data from the frame capture module 201 is fed to the downsampling and grayscale conversion module 202 to reduce the amount of data required to represent the image. Downsampling may consist of decimation, averaging, or filtering. For example, a 640×480 pixel resolution may be halved in both length and width to reduce the amount of image data by three-fourths without appreciable degradation to correlation accuracy. The downsampled data may also be converted from a 3-channel RGB data to grayscale format. The output of the downsampling and grayscale conversion 202 module represents a new image 204 from the current captured frame. It is used by the correlators 206 to search for image displacement of the new image 204 from an earlier (old) image 205 read from the storage 203 to estimate vehicle motion. The new image 204 is also fed to the storage 203 to be used as an old image 205 during subsequent correlation. The storage 203 may store just one frame of captured data with each old image 205 read out into the correlator 206 for correlation with the new image 204 after a one frame delay. Alternatively, in a burst mode, since multiple frames of data may be captured in a burst and then processed over the remainder of the second, storage 203 may have to be large enough to store all the captured frames in a burst period so that they may be read out for subsequent correlation.

The correlator 206 may be composed of one or more correlators. The correlator 206 takes as its input the new image 204 and the old image 205 and determines the displacement of image elements from the old image 205 to the new image 204 that results in the best correlation of the two images. Correlation may be implemented in the time domain or may be implemented in the frequency domain. Distinguishable patterns or elements in the image move up the field of view in the new image as compared to the old image as the vehicle moves forward, with new elements entering from the bottom of the field of view. The amount of displacement of the distinguishable elements in the two images is limited by the time interval between frame capture. However, correlation between elements in the two images may be degraded due to a perspective effect which compresses elements as they move further away from the camera and recede in the field of view. The degree of perspective effect is a function of the ground distance of an element from the camera, vehicle velocity, and the time between frames. For example, an element closer to the camera or near the bottom of the field of view experiences greater perspective effect in both the X and Y axis per given increase in ground distance of the element from the camera than an element that is further away. Perspective effect in the longitudinal axis or X-axis of the camera is also in the opposite direction for elements on opposite sides of the vertical or Y-axis if the camera motion is along the horizontal center line bisecting the horizontal view angle. For example, for lines parallel to the horizontal center line, perspective effect will cause the lines to converge to a horizon point in the center of the image. Perspective effect of elements between two images increases as vehicle velocity increases using an equal time interval between frame capture. Thus, the capability of the correlator 206 to determine image displacement from correlation and to track objects diminishes as a greater vehicle velocity causes a greater perspective effect. Additionally, the camera lens may cause image warping, especially for elements near the camera, exacerbating the already diminished correlation due to the greater perspective effect of the near element. To reduce the negative effects of perspective effect and lens warping on correlation, images may be processed prior to correlation. However, this may significantly increase processing requirement on the VDR system. Alternatively, multiple correlators may be used. In addition to alleviating some of the error attributable to perspective effect, multiple correlators have the additional advantage of increasing the observability of the states.

Each correlator is assigned a correlator region and also a search space within which the correlator region is to be displaced when searching for correlation. Both the correlator region and the search space are further restricted to regions below the horizon. If there are multiple correlators the regions assigned to the correlators may be disjoint, or they may abut, or overlap. Similarly, the search space for the multiple correlator regions may be disjoint, or they may abut, or overlap. The search for correlation is essentially a two-dimensional signal detection. As known in the correlation arts, multiple methods of signal detection exist; the method described herein uses a correlation peak detection according to one embodiment of the present disclosure. Correlation may be performed by shifting the correlator region within the search space, taking pixel values of the new image 204 bounded by the shifted correlator region, subtracting off a mean value, multiplying these values against the pixel values of the corresponding pixels of the old image 205 bounded by the original correlator region, and summing the pixel product over the correlator region. In effect, the correlator looks for parts of the old image 205 in the new image 204 over all the possible displacements within the search space. In one embodiment, the displacement of the correlator region within the search space yielding the largest positive correlation is taken as the output from the correlator. The correlator may use feedback so that a displacement found from a previous correlation may be used to assist in the current correlation. Such feedback may reduce the search space as image displacement is not likely to change drastically over a few consecutive frames and the displacement for the current correlation is likely to be close to a displacement for the preceding correlation. The image displacement determined by each correlator may be represented by a displacement vector. Such a displacement vector represents the shift or translation in position for any point in the new image as compared to a corresponding point in the old image.

The VDR state estimator 207 takes the image displacement data (such as image displacement vectors) from the correlators and estimates vehicle velocity and turn rate. The VDR state estimator 207 also estimates the spatial parameters of the camera, including parameters such as dz (vertical offset) and δ (declination angle) that could change as a function of vehicle loading and road condition. The processing method to estimate the vehicle motion from the image displacement data involves a conversion of an initial position in the image domain to an initial position on the ground in the camera frame and finally to a position on the ground in the vehicle frame as a function of the camera's spatial parameters (dx, dy, dz, δ, φ, ρ, α, β. The vehicle frame is defined by an x-y plane where the y axis crosses the body center of the vehicle and is parallel to the vehicle length, and the x-axis crosses the body center and is perpendicular to the y-axis. The output from the VDR state estimator 207 is an estimate of the vehicle's velocity in the x, y axis of the vehicle frame, an estimate of an angular displacement rate referenced to the body center of the vehicle, and an estimate of the spatial parameters of the camera. The VDR state estimator 207 may use output estimates from a previous iteration as initial estimates of the vehicle motion and the camera's spatial parameters during a current iteration. The GPS state estimator 208, which uses the output estimates from the VDR state estimator 207 along with a GPS signal to derive the vehicle's navigation solution, may also provide feedback to calibrate the VDR state estimator 207 with absolute velocities and angular displacement.

Figures 3A, 3B:
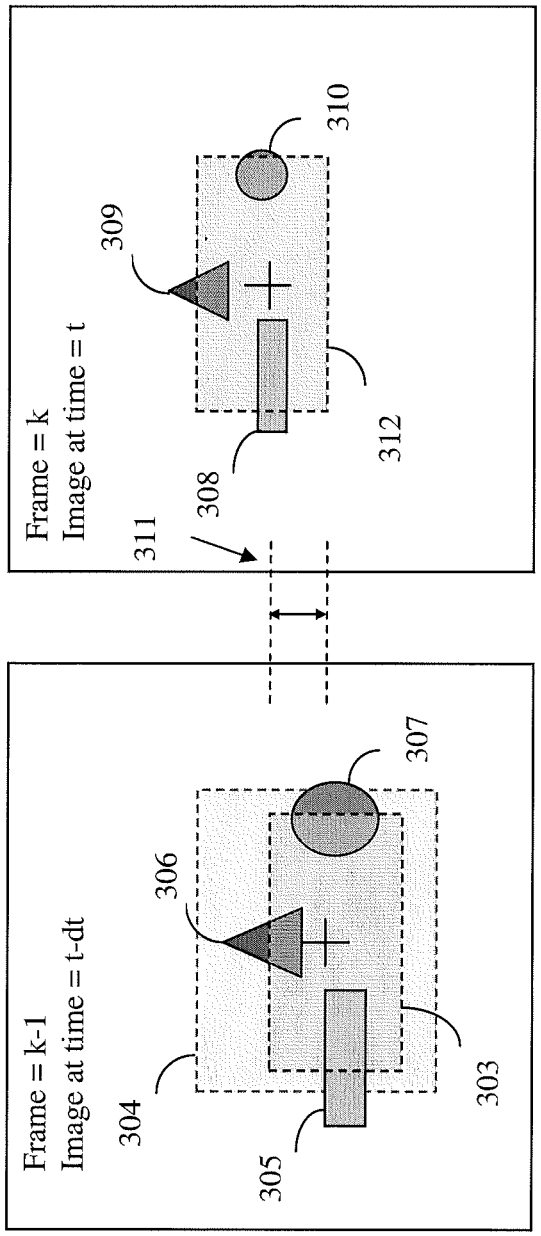
FIG. 3A shows a first frame of image data from a back-up camera wherein one correlator correlates image data for estimating an image displacement.
FIG. 3B shows a second frame of image data from the back-up camera of FIG. 3B.

FIGS. 3A and 3B illustrate the use of one correlator to correlate two frames of image data from the back-up camera for estimating image displacement caused by camera motion according to one or more embodiments of the present disclosure. As mentioned, image data is subject to a perspective effect as objects are displaced within the camera's field of view. This perspective effect degrades the correlation of objects in the image. The greater the displacement of objects, the greater the perspective effect, resulting in reduced correlation and a diminished capability of the VDR state estimator to track vehicle motion. In FIGS. 3A-3B, the camera motion is directly forward along a line bisecting the horizontal field of view. The motion is assumed small enough and the frame images are taken rapidly enough such that the object displacement is still trackable. FIG. 3A shows the old image, or the first image, at time t−dt for frame k−1 whereas FIG. 3B shows the new image, or the second image, at time t for frame k, where dt is the time between frames.

The single correlator of FIG. 3A defines a correlator region 303 within which correlation is to be performed for the old image. In this image, there are three objects—a rectangle 305, a triangle 306, and a circle 307. For simplicity, the objects in each image are not shown with any perspective effect even though the bottom of each object is at a shallower depth than the top of the object. In the old image of FIG. 3A, part of the rectangle 305, part of the triangle 306, and part of the circle 307 overlap the correlator region 303. As the vehicle moves forward, the objects are displaced further away from the camera and move up vertically in the new image of FIG. 3B. Perspective effect causes the objects to be compressed in both the horizontal x direction and the vertical y direction as they move up. The amount of compression is a function of the object's position in the image. For example, objects closer to the camera, manifested as having a shorter vertical distance in the image plane, will experience greater compression when they are displaced vertically than objects that are further away. Additionally, objects not located at the center of the image are laterally displaced in the x direction as they move up in the image when the vehicle moves forward. The direction of the lateral movement is opposite in sign for objects on opposite sides of the center of the image. Therefore, objects that are closer to side edges of the image will manifest greater lateral movement toward the center of the image when they move further away from the camera than objects near the center of the image.

Referring now to the new image of FIG. 3B, a rectangle 308 (corresponding to rectangle 305 in the old image) is compressed as it has moved up from its original position in the old image of FIG. 3A. The rectangle 308 has been displaced upward and rightward toward the center of the image, and has also become smaller in both width and height than the corresponding rectangle 305 in the old image. Similarly, a circle 310 in the new image has been displaced upward and leftward toward the center of the image, and has also become smaller in diameter than the corresponding circle 307 in the old image. The triangle 306 in the old image is further up in vertical distance (nearer the horizon as viewed by the camera) than either the rectangle 305 or the circle 307. It is also closer to the center of the image than the other two objects. Therefore, the amount of compression and displacement manifested by a corresponding triangle 309 in the new image is less than that of the other two objects.

Correlation of the two images is performed to determine a displacement for the correlator region 303 from its original position in the old image to find a maximum correlation between image elements within the original correlator region 303 in the old image and image elements within the corresponding displaced correlator region 312 in the new image. Correlation is performed for various displacements of the correlator region 303 over a search area 304. The output of the correlator is the displacement that yields the maximum correlation between the two images. The search area 304 may be adjusted using an output from the previous correlation based on the assumption that vehicle motion and thus the displacement for the maximum correlation are likely to remain constant over a relatively short period of time. This will help to reduce the computational load of the correlation search. Because the rectangle 305 and the circle 307 have about the same vertical distance and the same horizontal distance from the center of the image, the two objects manifest the same degree of compression and equal but opposite lateral movement toward the center of the image as seen for corresponding elements 308 and 310 in the new image. Therefore, there is now more overlap between the rectangle 308 and the circle 310 within the displaced correlator region 312 in the new image than in the old image. The increased overlap of the objects within the displaced correlator region 312 in the new image degrades the correlation between the two correlator regions 303 and 312. However, the degradation is small enough such that the correlation will yield a maximum value when the correlator region 312 has been displaced in the vertical direction by the same amount as the vertical displacement of the image. A correlator displacement vector 311 represents the estimated image displacement output from the correlator into the VDR state estimator 207. Correlation peak detection as herein described represents only one possible embodiment of the present disclosure for estimating image displacement. The present disclosure for estimating image displacement may be embodied in other forms, such as signal detection in the frequency domain.

FIGS. 4A and 4B illustrate the use of two correlators to correlate the two frames of image data of FIG. 3 for estimating the image displacement caused by camera motion according to one or more embodiments of the present disclosure. Similar to FIG. 3A and 3B, FIG. 4A shows the old image, or the first image, at time t−dt for frame k−1 whereas FIG. 4B shows the new image, or the second image, at time t for frame k, where dt is the time between frames. There are now two correlator regions 403 and 404 in the old image of FIG. 4A. These correlator regions 403 and 404 may be disjoint, as shown, or they may abut or overlap. The area of the image bounded by each correlator region according to the current embodiment is about half of the area covered by the single correlator of FIGS. 3A and 3B. However, other correlator region arrangements are possible in other embodiments. A rectangle 305 partially overlaps the left correlator region 403; a circle 307 partially overlaps the right correlator region 404; and a triangle 306 partially overlaps both correlators regions 403 and 404. As before, objects are displaced as the camera moves forward along a line bisecting the horizontal field of view. In FIG. 4B, the three objects have been compressed and displaced as discussed with regard to FIG. 3.

Correlation for the left correlator region 403 is performed by displacing the correlator region 403 from its original position within a search area 405 in the old image to find a maximum correlation between image elements within the original correlator region 403 in the old image and image elements within the corresponding displaced correlator region 410 in new image. Similarly, correlation for the right correlator region 404 is performed by displacing the correlator region 404 from its original position within a search area 406 in the old image to find a maximum correlation between image elements within the original correlator region 404 in the old image and image elements within the corresponding displaced correlation region 411 in new image. The search spaces 405 and 406 for the two correlators regions may be defined independently. Each correlator may use its previous solution to aid the current search space. Alternatively, if one of the correlators failed to generate a solution, it may borrow the other correlator's solution to aid its search.

Having two smaller correlators may alleviate some of the degradation in correlation attributable to the perspective effect during correlation with one larger correlator. For example, degradation in correlation between regions 403 and 410 still exists because of the greater overlap between the rectangle 308 and the triangle 309 within the displaced correlator region 410 in the new image of FIG. 4B as compared to the overlap between the corresponding rectangle 305 and the corresponding triangle 306 within the correlator region 403 in the old image. Degradation in correlation also exists because of the compression of the objects in the new image. However, in contrast to the single correlator of FIG. 3, there is no overlap between the displaced left correlator region 410 and the circle 310. Any degradation in correlation manifested by the circle 310 due to perspective effect is now absent for the displaced left correlator region 410. Similarly, there is no overlap between the displaced right correlator region 411 and the rectangle 308. Any degradation in correlation manifested by the rectangle 308 due to perspective effect is also absent for the displaced right correlator region 411. Reduction in correlation degradation from perspective effect due to the smaller correlators may thus enhance the ability of the VDR state estimator to track vehicle motion.

Having two correlators also allows for another equation in the solution for vehicle motion since there are now two image displacement estimates generated from the two correlation results. For example, the position of the left correlator region 410 in the new image of FIG. 4B corresponds to the maximum correlation between the new image bounded by the displaced left correlator region 410 and the old image bounded by the left correlator region 403. The displacement of the displaced left correlator region 410 relative to the original left correlator region 403 is in an upward and rightward direction and represents an image displacement vector estimate 415 as seen by the correlator corresponding to left correlation region 403. Similarly, the position of the displaced right correlator region 411 in the new image of FIG. 4B corresponds to the maximum correlation between the new image bounded by the displaced right correlator region 411 and the old image bounded by the right correlator region 404. The displacement of the displaced right correlator region 411 relative to the original right correlator region 404 is in an upward and leftward direction and represents an image displacement vector estimate 416 as seen by the correlator corresponding to the right correlator region 404. Assuming the correlator regions are equally displaced from the center of the image and the rotation angle ρ is zero, because the camera moves straight forward along the line bisecting the horizontal field of view, the two correlators will have equal and opposite estimates for the horizontal components of the image displacement vectors 415 and 416. The faster the vehicle velocity, the larger the horizontal displacement estimates. If the vehicle is turning, the difference between the left correlator image displacement vector 415 and the right correlator image displacement vector 416 may also indicate turn rate.

Figure 5A:
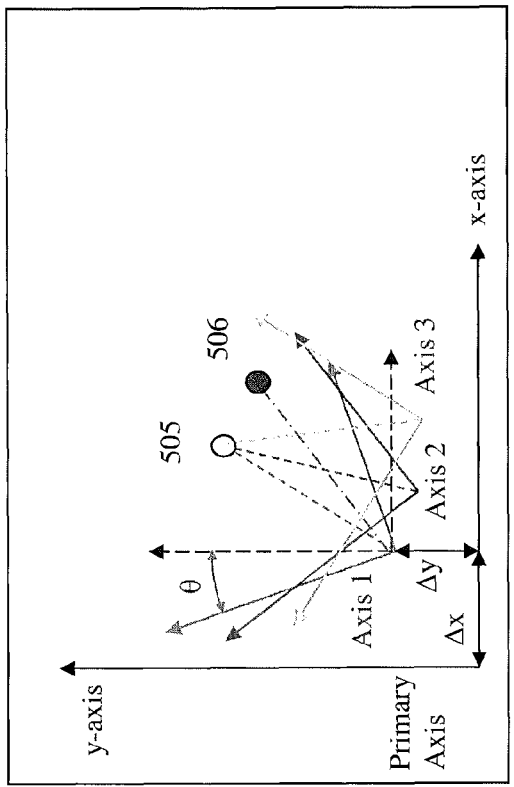
FIG. 5A is an illustration of the displacement of sample points under multiple displacements of the vehicle frame of reference due to vehicle motion according to one or more embodiments of the present disclosure.
Figure 5D:
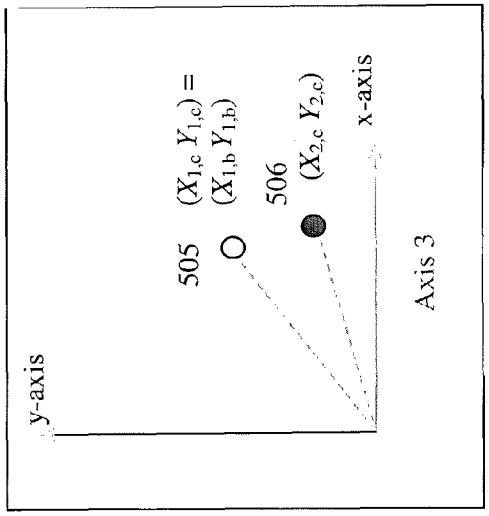
FIG. 5D is an illustration of a subsequent position of sample points after a second displacement of the vehicle frame of reference of FIG. 5A.
Figure 5C:
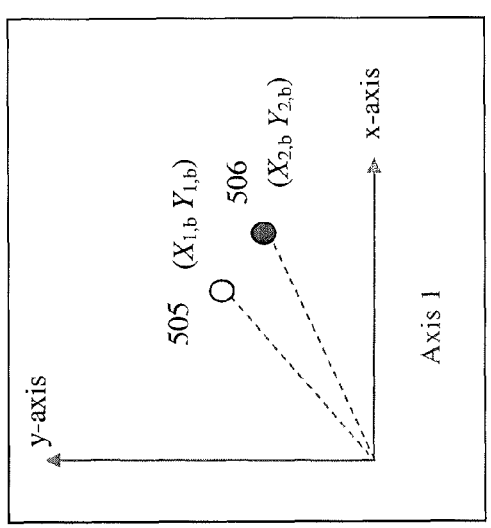
FIG. 5C is an illustration of a subsequent position of sample points after a first displacement of the vehicle frame of reference of FIG. 5A.
Figure 5B:
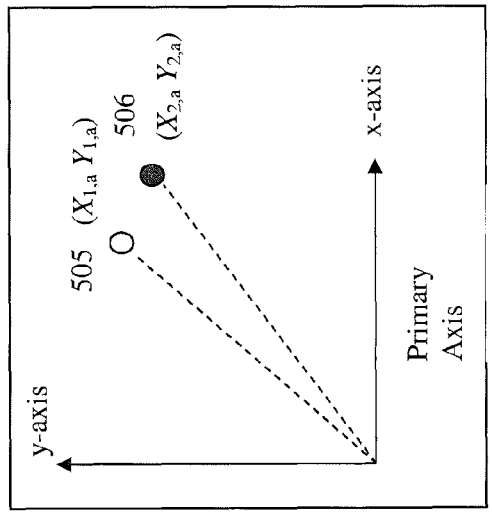
FIG. 5B is an illustration of an initial position of sample points in a vehicle frame of reference according to one or more embodiments of the present disclosure.

To illustrate how multiple correlators allow for more equations in estimating vehicle motion, refer to FIGS. 5A through 5D, which illustrate the displacement of sample points as a vehicle frame of reference changes due to vehicle motion according to one or more embodiments of the present disclosure. FIG. 5A shows the displacement of sample points under multiple displacements of the vehicle frame of reference due to vehicle motion. In FIG. 5A, the primary axis represents the vehicle frame of reference at time t where the body center of the vehicle is at the origin. For simplicity assume the camera is also located at the origin and the center of the image is aligned with the y-axis of the primary axis. If there is only one correlator then only one estimate of vehicle motion is available. Assume the correlator tracks the displacement of a sample point 505 to estimate the vehicle motion. FIG. 5B shows that the sample point 505 has an initial position of $(X_{1,a}, Y_{1,a})$ at time t. Between time t and t+dt the vehicle moves by $\Delta x$ in the x axis, by $\Delta y$ in the y axis, and also turns by angle $\theta$ as shown in FIG. 5A. The new vehicle frame of reference at time t+dt is transformed to axis 1 with the body center of the vehicle at the origin of axis 1 and the center of the image aligned with the y-axis of axis 1. FIG. 5C shows that the new position of sample point 505 is at $(X_{1,b}, Y_{1,b})$ after the axis transformation. The correlator estimates a displacement vector for sample point 505 of $(X_{1,b}, Y_{1,b})-(X_{1,a}, Y_{1,a})$. It is desired to solve for the vehicle motion of $(\Delta x, \Delta y, \theta)$ from the displacement vector of $(X_{1,b}, Y_{1,b})-(X_{1,a}, Y_{1,a})$. However, the displacement vector only provides two equations, one for the x dimension and one for the y dimension, which is insufficient to solve for the three degrees of freedom associated with the axis transformation. This is illustrated by showing that there are multiple displacements of the vehicle frame of reference that may also generate the same displacement vector. For example, if the new vehicle frame of reference had been transformed to either axis 2 or axis 3 as shown in FIG. 5A such that the body center of the vehicle is at the origin of axis 2 or axis 3 respectively, the new position of sample point 505 with respect to axis 2 or axis 3 may be indistinguishable from its position with respect to axis 1. FIG. 5D shows that with an axis transformation of the vehicle frame of reference to axis 3 the new position of sample point 505 represented as $(X_{1,c}, Y_{1,c})$ is equal to $(X_{1,b}, Y_{1,b})$. Therefore, the displacement vector of sample point 505 does not allow for solution of a unique axis transformation. However, if there is another correlator available then the second correlator may track the displacement of a second sample point 506. From FIG. 5B, the sample point 506 has an initial position of $(X_{2,a}, Y_{2,a})$ at time t. FIG. 5C shows that after axis transformation the sample point 506 is at $(X_{2,b}, Y_{2,b})$. The second correlator estimates a displacement vector for sample point 506 of $(X_{2,b}, Y_{2,b})-(X_{2,a}, Y_{2,a})$. Now with two displacement vectors from the two correlators a unique solution for the axis transformation may be found because there is only one axis transformation that solves for both displacement vectors $(X_{1,b}, Y_{1,b})-(X_{1,a}, Y_{1,a})$ and $(X_{2,b}, Y_{2,b})-(X_{2,a}, Y_{2,a})$. As shown in FIG. 5D, the new position of sample point 506 represented as $(X_{2,c}, Y_{2,c})$ in the axis transformation of axis 3 is different than the new position of sample point 506 represented as $(X_{2,b}, Y_{2,b})$ in the axis transformation of axis 1 shown in FIG. 5C. Therefore, the second correlator provides the extra equation to solve for the vehicle motion.

The number of correlators may be extended beyond two. For example, with four correlators, there may be additional observability into states of the image due to perspective effect as the depth of objects in the frame increases. The trade off is that with multiple correlators (possibly bounding increasingly smaller region of the image), the sharpness of the correlation peak may become less distinct because less image area may result in less contrast. Additionally, even if the total area of the images to be correlated remains the same, each correlator may have its independent search area. Therefore, the search space as a whole may increase as the number of correlators is increased and the processing requirement may correspondingly increase.

Figure 6:
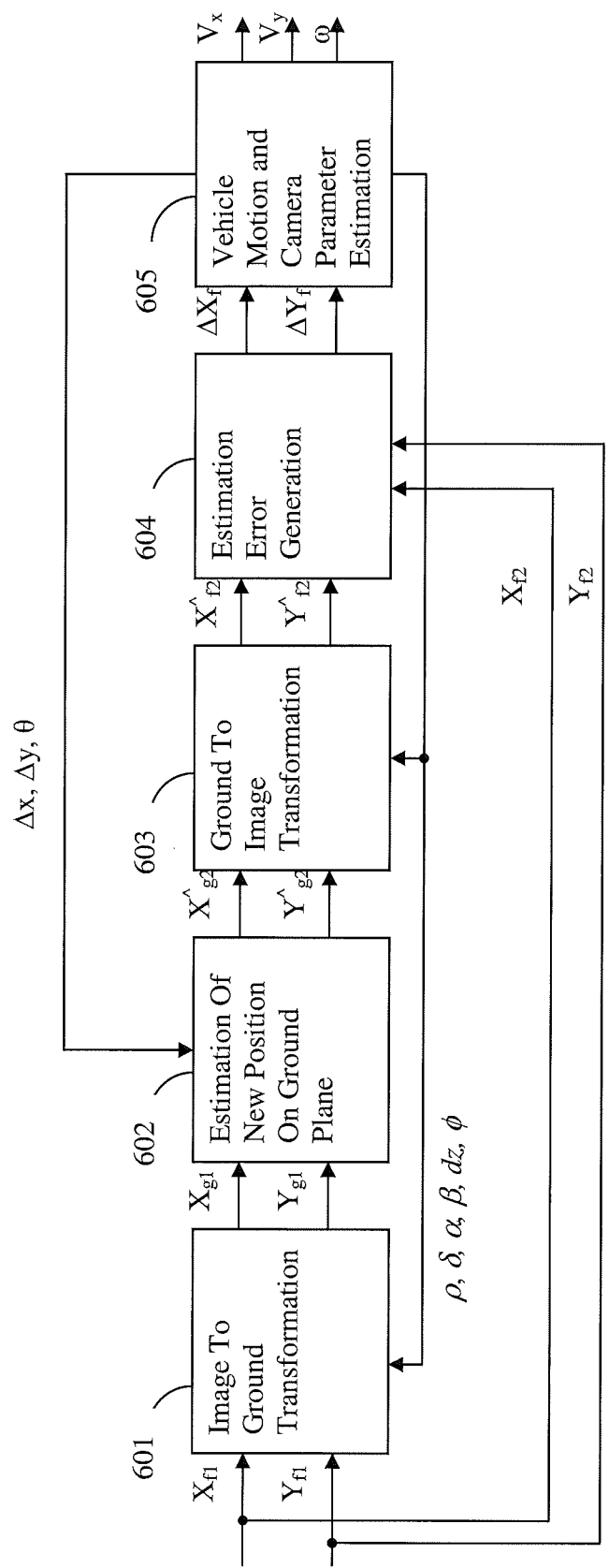
FIG. 6 is a block diagram of a VDR state estimator according to one or more embodiments of the present disclosure.

FIG. 6 is a block diagram of a VDR state estimator showing the image processing performed on the output from the correlator to estimate the velocity of the vehicle, the turn rate of the vehicle, and the camera's spatial parameters according to one or more embodiments of the present disclosure. A module 601 transforms an object's initial position in the image plane $(X_{f1}, Y_{f1})$ as provided by each correlator to its position on the ground plane in the vehicle's frame of reference $(X_{g1}, Y_{g1})$ using an initial estimate of the camera's spatial parameters from a vehicle motion and camera parameter estimation module 605. An initial estimate of the vehicle motion is also made by the vehicle motion and camera parameter estimation module 605. This estimate is used by module 602 to estimate the displaced object's new ground position in the vehicle's frame of reference $(\hat{X}_{g2}, \hat{Y}_{g2})$ based on the object's initial position $(X_{g1}, Y_{g1})$. This initial estimate of the displaced object's new ground position in the vehicle's frame of reference $(\hat{X}_{g2}, \hat{Y}_{g2})$ is transformed from the ground plane back to its estimated position in the image plane $(\hat{X}_{f2}, \hat{Y}_{f2})$ by a module 603. The estimated position in the image plane $(\hat{X}_{f2}, \hat{Y}_{f2})$ of the displaced object is compared with the measured position $(X_{f2}, Y_{f2})$ of the displaced object as provided by the image displacement output from the correlator. An estimation error $(\Delta X_f, \Delta Y_f)$ between the estimated position $(\hat{X}_{f2}, \hat{Y}_{f2})$ and the measured position $(X_{f2}, Y_{f2})$ of the displaced object is calculated by a module 604. The estimation error $(\Delta X_f, \Delta Y_f)$ is used by vehicle motion and camera parameter estimation 605 to update its initial estimates of the vehicle motion and the camera's spatial parameters. The updated estimates of the vehicle motion and the camera's spatial parameters are then used again by modules 601 and 602 to update its estimate of the displaced object's new ground position in the vehicle's frame of reference $(\hat{X}_{g2}, \hat{Y}_{g2})$. The process is repeated iteratively until the estimation error $(\Delta X_f, \Delta Y_f)$ approaches zero, at which time a solution is declared and the vehicle motion $(V_x, V_y, \omega)$ is derived.

Module 601 performs the transformation of an object's position in the image plane to its position on the ground plane in the vehicle's frame of reference based on an estimate of the camera's spatial parameters. It performs the transformation on the object's initial position $(X_{f1}, Y_{f1})$ from each correlator. It may also perform the transformation on the object's displaced position $(X_{f2}, Y_{f2})$ as measured by the image displacement from the correlator if an estimation error is calculated in the ground plane. The transformation is a function of the camera's spatial parameters—$\rho$, $\delta$, $\alpha$, $\beta$, dz, $\phi$. It may consist of an image de-rotation to compensate for any twist in the image created by a non-zero rotation or twist angle $\rho$, an image to ground transformation using parameters $\delta$, $\alpha$, $\beta$, and dz to map a position from the image plane to the ground plane in the camera's frame of reference, and another transformation using $\phi$ to map the position on the ground plane in the camera's frame of reference to the position on the ground plane in the vehicle's frame of reference.

The image de-rotation receives the initial position $(X_{f1}, Y_{f1})$ from one or more correlators and de-rotates it by the rotation or twist angle $\rho$. As shown in FIG. 1C, an image may be twisted if the camera has a non-zero rotation or twist angle $\rho$. Therefore, the initial position $(X_{f1}, Y_{f1})$ provided by the correlator from the twisted image may be de-rotated by $\rho$ such that the horizon line may be made parallel to the x-axis of the image. Image de-rotation may be bypassed if $\rho$ is zero or small. A de-rotated position in the image plane may then be transformed to its position in the ground plane in the camera's frame of reference. Details of this transformation will be explained later with reference to FIG. 7. If the pan angle $\phi$ is non-zero indicating the camera's x-y axis is rotated from the vehicle's x-y axis then another transformation may be performed to remove the effect of $\phi$. This transformation may be a rotation of the object's position in the camera's frame of reference by $\phi$ so that the object's position on the ground plane $(X_{g1}, Y_{g1})$ is expressed with respect to the vehicle's frame of reference where the y axis is parallel to the length of the vehicle.

An initial estimate of the vehicle motion and the camera's spatial parameters is made by module 605. This estimate may be based on a previous solution from the VDR state estimator. Vehicle motion is expressed in $V_x$ (vehicle motion projected onto the vehicle x-axis), $V_y$ (vehicle motion projected onto the vehicle y-axis), and turn rate, $\omega$. Based on the estimated vehicle motion, an initial estimate of the vehicle displacement is made. Vehicle displacement is expressed as $\Delta x$ (vehicle displacement along the vehicle x-axis), $\Delta y$ (vehicle displacement along the vehicle y-axis), and $\theta$ (the vehicle's angular rotation). Module 602 uses the initial estimate of vehicle displacement and the object's initial position $(X_{g1}, Y_{g1})$ on the ground plane in the vehicle's frame of reference from module 601 to estimate the displaced object's new ground position in the vehicle's frame of reference $(\hat{X}_{g2}, \hat{Y}_{g2})$. $(\hat{X}_{g2}, \hat{Y}_{g2})$ may be estimated by displacing $(X_{g1}, Y_{g1})$ by $(\Delta x, \Delta y)$ and then rotating it by $\theta$.

The initial estimate of the displaced object's new ground position in the vehicle's frame of reference $(\hat{X}_{g2}, \hat{Y}_{g2})$ is transformed from the ground plane back to the image plane $(\hat{X}_{f2}, \hat{Y}_{f2})$ by module 603 based on an estimate of the camera's spatial parameters so that it can be compared with the measured position ($X_{f2}$, $Y_{f2}$) as provided by the correlator. Transformation from the ground plane in the vehicle's frame of reference to the image plane performed by module 603 is the inverse of the transformation performed by module 601. Like the transformation in module 601, the transformation in module 603 is a function of the camera's spatial parameters $\rho$, $\delta$, $\alpha$, $\beta$, $dz$, and $\phi$. The transformation may consist of a transformation with $\phi$ to map the object's position on the ground plane in the vehicle's frame of reference to its position on the ground plane in the camera's frame of reference, a transformation with $\delta$, $\alpha$, $\beta$, $dz$ to map the position on the ground plane in the camera's frame of reference to a position on the image plane, and a final rotation with a non-zero rotation or twist angle $\rho$ to rotate the image.

Module 604 generates the estimation error ($\Delta X_f$, $\Delta Y_f$) by taking the difference between the displaced object's estimated position in the image plane ($X\hat{}_{f2}$, $Y\hat{}_{f2}$) and its measured position ($X_{f2}$, $Y_{f2}$) from the correlator. Alternatively, the estimation error may be calculated in the ground plane instead of in the image plane. If the estimation error is calculated in the ground plane, the measured position of the displaced object ($X_{f2}$, $Y_{f2}$) is first transformed from the image plane to the ground plane in the vehicle's frame of reference by module 601 and then compared with the estimate of the displaced object's new ground position in the vehicle's frame of reference ($X\hat{}_{g2}$, $Y\hat{}_{g2}$) to generate the estimation error.

The estimation error, whether in the image plane ($\Delta X_f$, $\Delta Y_f$) or in the ground plane, is used by module 605 to update its initial estimate of the vehicle's motion ($V_x$, $V_y$, $\omega$) or displacement ($\Delta x$, $\Delta y$, $\theta$). The estimation error is also used by module 605 to update its initial estimate of the camera's spatial parameters $\rho$, $\delta$, $\alpha$, $\beta$, $dz$, and $\phi$. This may be performed by first calculating the Jacobian of the equation relating a position of an object in the image plane to the vehicle displacement and the camera's spatial parameters to be estimated ($\Delta x$, $\Delta y$, $\theta$, $\rho$, $\delta$, $\alpha$, $\beta$, $dz$, $\phi$) if the estimation error is calculated in the image plane. Alternatively, if the estimation error is calculated in the ground plane, the Jacobian of the equation relating a position of an object in the ground plane to the vehicle displacement and the camera's spatial parameters is calculated. The pseudo-inverse of the Jacobian is then found and multiplied with the estimation error to estimate an error associated with the initial estimates of the vehicle displacement and the camera's spatial parameters. The initial estimates of the vehicle displacement ($\Delta x$, $\Delta y$, $\theta$) and the camera's spatial parameters ($\rho$, $\delta$, $\alpha$, $\beta$, $dz$, $\phi$) are updated with the estimated error thus found. The VDR state estimator is rerun with the updated estimate to generate a new estimation error ($\Delta X_f$, $\Delta Y_f$) and a new estimate of the vehicle displacement and the camera's spatial parameters are generated from the new estimation error. The process is run repeatedly until the estimation error ($\Delta X_f$, $\Delta Y_f$) approaches zero, and if so, a solution is then declared and the vehicle motion ($V_x$, $V_y$, $\omega$) derived. If the iteration does not converge, the process is aborted and the system reports an identifier to signal no solution was found.

Figure 7:
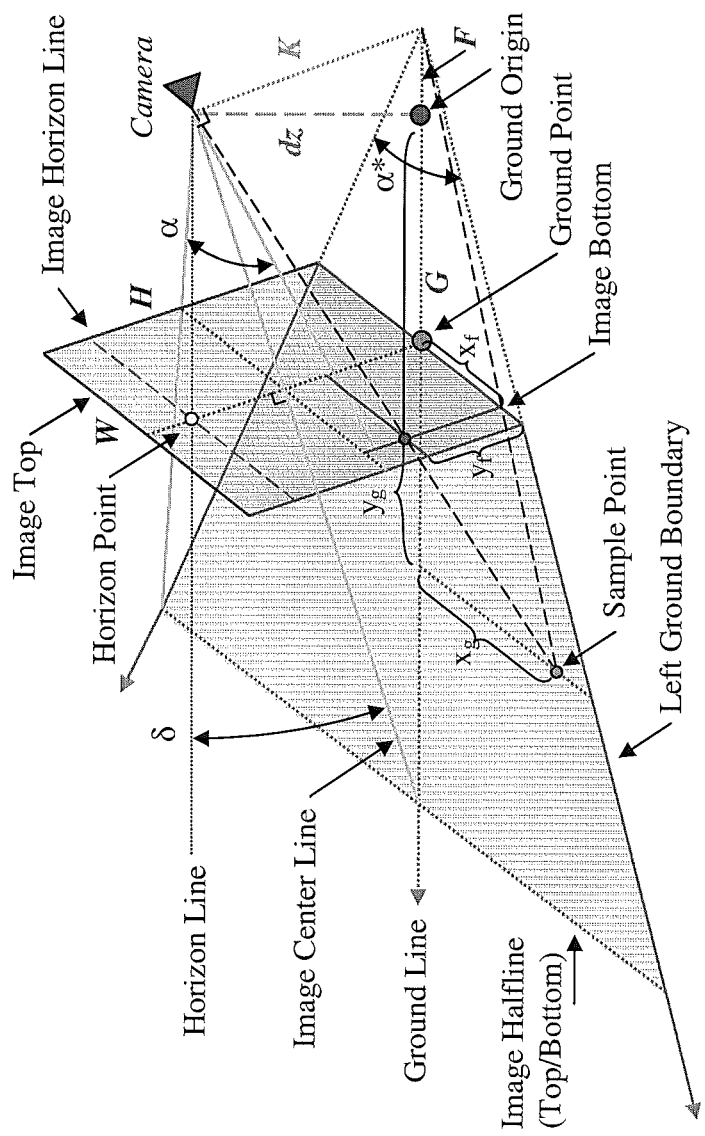
FIG. 7 is a 2-D perspective rendering of the transformation of a sample point from a ground plane onto an image plane of the back-up camera and vice-versa according to one or more embodiments of the present disclosure.

FIG. 7 is a 2-D perspective rendering of the transformation of a sample point from the ground plane onto the image plane of the back-up camera and vice-versa according to one or more embodiments of the present disclosure. The transformation is part of the image-to-ground transformation by module 601 and the ground-to-image transformation by module 603. Given a sample point in the image plane represented by ($x_f$, $y_f$), it is desired to calculate the position of the sample point in the ground plane ($x_g$, $y_g$), where $x_f$ is the horizontal distance of the sample point in the image plane from the center of the image plane, $y_f$ is the vertical distance of the sample point in the image plane from the bottom of the image plane, $x_g$ is the distance of the sample point on the ground plane from the projection of the image center line on the ground (the ground line), and $y_g$ is the distance of the sample point on the ground plane from the camera's ground point (the ground origin). In FIG. 7, $\alpha$ is the horizontal view angle, $\delta$ is the declination angle, and $dz$ is the vertical offset as defined in FIG. 1D. If $\beta$ is the vertical view angle, H is the vertical size of the image, K is the vertical size of the image below the horizon line, D is the perpendicular distance of the image center line from the camera to the image plane, G is the distance from the intersection of the ground line with the image plane, or the ground point, to the ground origin, and J is the distance of the horizon line from the intersection of the horizon line with the image plane, or the horizon point, to the camera, then G,J,D,H,K may be expressed in terms of $\beta$, $\delta$, $dz$ as:

$$G = dz/(\tan(\delta + \beta/2))$$

$$J = G + dz \cdot \tan(\delta)$$

$$D = J \cdot \cos(\delta)$$

$$H = 2 \cdot D \cdot \tan(\beta/2)$$

$$K = dz/\cos(\delta)$$

Furthermore, if W is the horizontal size of the image, F is the distance from the ground origin to the intersection of the ground line with a line originating from the camera and co-linear with H, and $\alpha^*$ is the horizontal view angle from the aforementioned intersection of the ground line with a line originating from the camera and co-linear with H, then $\alpha^{*'}$, F, W may be expressed in terms of $\alpha$, $\delta$, $dz$ as:

$$\tan(\alpha^*/2) = \tan(\alpha/2) \cdot \cos(\delta);$$

$$F = dz \cdot \tan(\delta);$$

$$W = 2(G+F) \cdot \tan(\alpha^*/2);$$

Finally, the transformation from ($x_f$, $y_f$) in the image plane to ($x_g$, $y_g$) in the ground plane may be expressed as:

$$y_g = ((y_f/H) \cdot H \cdot F + K \cdot G)/(K - (y_f/H) \cdot H)$$

$$x_g = (x_f/W) \cdot W \cdot ((y_g + F)/(G+F))$$

where the sample point in the image plane (($x_f/W$), ($y_f/H$)) is expressed as a fraction of the horizontal and vertical size of the image.

Therefore, the image from the back-up camera is processed by the VDR state estimator 207 to generate the velocity and the turn-rate of the vehicle provided to the GPS state estimator 206 to aid in the navigation solution. By using the back-up camera as a dead-reckoning device, enhanced vehicle navigation performance can be obtained without adding new sensors and/or connecting to a vehicle data bus.

Although embodiments of the present disclosure have been described, these embodiments illustrate, but do not limit the invention. It should be understood that embodiments of the present disclosure should not be limited to these embodiments but that numerous modifications and variations may be made by one of ordinary skill in the art in accordance with the principles of the present disclosure and be included within the spirit and scope of the present disclosure as hereinafter claimed.

We claim:

1. A vehicle navigation system comprising:
   a back-up camera mounted on a rear of a vehicle to provide video data of ground features to the rear of the vehicle to provide back-up camera images to a display in the vehicle and to provide dead reckoning images, wherein a motion of the camera is forward along a line bisecting a horizontal field of view of the camera;
   a video dead-reckoning subsystem to correlate the dead reckoning images from the back-up camera for generating an estimated motion of the vehicle; and
   a satellite-based navigation system to use the estimated motion of the vehicle to aid in generating a navigation solution for the vehicle.

2. The vehicle navigation system of claim 1, wherein the video dead-reckoning subsystem receives the dead reckoning images from the back-up camera through a wired connection.

3. The vehicle navigation system of claim 1, wherein the video dead-reckoning subsystem receives the dead reckoning images from the back-up camera through a wireless connection.

4. The vehicle navigation system of claim 1, wherein the video dead-reckoning subsystem further comprises:
   a frame capture module to sample the dead reckoning images in a frame to provide sampled video data;
   a memory to store one or more frames of the sampled dead reckoning images;
   one or more correlators to perform image correlation between two frames of the sampled dead reckoning images to search for one or more displacement vectors; and
   a video dead-reckoning state estimator to estimate motion of the vehicle and spatial parameters of the back-up camera from the one or more displacement vectors.

5. The vehicle navigation system of claim 4, wherein each of the one or more correlators is assigned a corresponding region within each frame of the sampled dead reckoning images.

6. The vehicle navigation system of claim 5, wherein each of the one or more correlators is configured to perform the image correlation through the acts of:
   taking pixel values of the sampled dead reckoning images within the corresponding region of the correlator from a first frame of the sampled video data;
   shifting the corresponding region of the correlator by a displacement to form a shifted region;
   taking pixel values of the sampled dead reckoning images within the shifted region of the correlator from a second frame of the sampled dead reckoning images;
   multiplying a pixel value of each pixel of the sampled dead reckoning images within the corresponding region of the correlator from the first frame of the sampled video data with a pixel value of a corresponding pixel of the sampled dead reckoning images video data within the shifted region of the correlator from the second frame of the sampled dead reckoning images to form a product; and
   summing the product over all pixels taken.

7. The vehicle navigation system of claim 6, wherein a plurality of image correlations is performed for a plurality of displacements of the corresponding region for each correlator.

8. The vehicle navigation system of claim 7, wherein the displacement for shifting the corresponding region of each correlator is restricted to a search space.

9. The vehicle navigation system of claim 8, wherein the displacement vector between two frames of the sampled dead reckoning images for each correlator is the displacement of the corresponding region corresponding to a largest of the plurality of image correlations.

10. The vehicle navigation system of claim 9, wherein for each correlator the displacement vector found for the image correlation between the first frame and the second frame of the sampled dead reckoning images video data is used to modify the search space for a next image correlation.

11. The vehicle navigation system of claim 5, wherein if there is more than one correlator the region corresponding to each correlator does not overlap with the regions corresponding to the remaining correlators.

12. The vehicle navigation system of claim 5, wherein if there is more than one correlator the region corresponding to one correlator overlaps with the region corresponding to another correlator.

13. A method of providing dead-reckoning data for a vehicle from a back-up camera without a dead-reckoning sensor to aid a satellite-based navigation system, comprising steps executed by a dead-reckoning device:
   receiving video data of ground features to the rear of the vehicle from the back-up camera, wherein a motion of the camera is forward along a line bisecting a horizontal field of view of the camera;
   sampling the video data in a first frame; sampling the video data in a second frame;
   correlating the video data in the first frame with the video data in the second frame to search for a displacement vector;
   estimating motion data of the vehicle from the displacement vector; and
   providing the motion data to the satellite-based navigation system.

14. The method of claim 13, wherein correlating the video data in the first frame with the video data in the second frame comprises:
   taking pixel values of the video data from a region of the first frame;
   shifting the region by a displacement to form a shifted region in the second frame;
   taking pixel values of the video data from the shifted region of the second frame;
   multiplying the pixel values for each pixel of the video data from the region of the first frame with the pixel values of a corresponding pixel of the video data from the shifted region of the second frame to form a product; and
   summing the product over all pixels from the region of the first frame and the shifted region of the second frame to form a correlation.

15. The method of claim 14, wherein correlating the video data in the first frame with the video data in the second frame is performed for a plurality of displacements to generate a plurality of correlations.

16. The method of claim 15, wherein the displacement vector is the displacement corresponding to a largest of the plurality of correlations.

* * * * *